US006917712B2

(12) United States Patent
Tsushima et al.

(10) Patent No.: US 6,917,712 B2
(45) Date of Patent: Jul. 12, 2005

(54) ENCODING APPARATUS AND DECODING APPARATUS

(75) Inventors: Mineo Tsushima, Osaka (JP); Takeshi Norimatsu, Hyogo (JP); Shuji Miyasaka, Osaka (JP); Tomokazu Ishikawa, Osaka (JP); Yoshiaki Sawada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 681 days.

(21) Appl. No.: 09/952,757

(22) Filed: Sep. 12, 2001

(65) Prior Publication Data

US 2002/0054646 A1 May 9, 2002

(30) Foreign Application Priority Data

Sep. 11, 2000 (JP) ...................................... 2000-275296

(51) Int. Cl.[7] .................................................. G06K 9/36

(52) U.S. Cl. ....................................... 382/232; 382/251

(58) Field of Search ................................ 382/232–352; 358/1.15, 500, 530, 448, 426.16; 341/50

(56) References Cited

U.S. PATENT DOCUMENTS 5,623,557 A * 4/1997 Shimoyoshi et al. ....... 382/246
5,642,437 A * 6/1997 Laczko et al. .............. 382/246
6,188,793 B1 * 2/2001 Kimura et al. .............. 382/238

* cited by examiner

*Primary Examiner*—Bhavesh M. Mehta
*Assistant Examiner*—Duy M. Dang
(74) *Attorney, Agent, or Firm*—Snell & Wilmer L.L.P.

(57) ABSTRACT

An encoding apparatus includes a quantized spectral sequence generation section for generating a quantized spectral sequence by quantizing an audio signal with a predetermined quantization precision, and a circulating code vector quantization section for outputting a spectral sequence code containing circulating position identification information indicating how much a reference spectral sequence is circulated to obtain a circulant quantized spectral sequence which is most similar to the quantized spectral sequence.

15 Claims, 14 Drawing Sheets

$$P_0 = \{c_0, c_1, c_2, c_3, c_4, \cdots, c_{15}\}$$
$$P_1 = \{c_{15}, c_0, c_1, c_2, c_3, \cdots, c_{14}\}$$
$$P_2 = \{c_{14}, c_{15}, c_0, c_1, c_2, \cdots, c_{13}\}$$
$$\vdots$$
$$P_n = \{c_{15-n+1}, \cdots, c_{15}, c_0, \cdots, c_{15-n}\}$$
$$\vdots$$
$$P_{15} = \{c_1, c_2, c_3, c_4, c_5, \cdots, c_{15}, c_0\}$$

*FIG.5*

$$P_0 = \{-c_0, -c_1, -c_2, -c_3, -c_4, \cdots, -c_{15}\}$$

$$P_1 = \{-c_{15}, -c_0, -c_1, -c_2, -c_3, \cdots, -c_{14}\}$$

$$P_2 = \{-c_{14}, -c_{15}, -c_0, -c_1, -c_2, \cdots, -c_{13}\}$$

$$\vdots$$

$$P_n = \{-c_{15-n+1}, \cdots, -c_{15}, -c_0, \cdots, -c_{15-n}\}$$

$$\vdots$$

$$P_{15} = \{-c_1, -c_2, -c_3, -c_4, -c_5, \cdots, -c_{15}, -c_0\}$$

104b

*FIG. 7*

104c $$P_0 = \{ c_0, 0, 0, 0, c_4, 0, 0, 0, c_8, 0, 0, 0, c_{12}, 0, 0, 0 \}$$

$$P_1 = \{ 0, c_0, 0, 0, 0, c_4, 0, 0, 0, c_8, 0, 0, 0, c_{12}, 0, 0 \}$$

$$P_2 = \{ 0, 0, c_0, 0, 0, 0, c_4, 0, 0, 0, c_8, 0, 0, 0, c_{12}, 0 \}$$

$$\vdots$$

$$P_n = \{ c_{15-n+1}, \cdots, c_{15}, c_0, \cdots, c_{15-n} \}$$

$$\vdots$$

$$P_{15} = \{ 0, 0, 0, c_4, 0, 0, 0, c_8, 0, 0, 0, c_{12}, 0, 0, 0, c_0 \}$$

*FIG.8*

$$P_0 = \{-c_0, 0, 0, 0, -c_4, 0, 0, 0, -c_8, 0, 0, 0, -c_{12}, 0, 0, 0\}$$

$$P_1 = \{0, -c_0, 0, 0, 0, -c_4, 0, 0, 0, -c_8, 0, 0, 0, -c_{12}, 0, 0\}$$

$$P_2 = \{0, 0, -c_0, 0, 0, 0, -c_4, 0, 0, 0, -c_8, 0, 0, 0, -c_{12}, 0\}$$

$$\vdots$$

$$P_n = \{-c_{15-n+1}, \cdots, -c_{15}, -c_0, \cdots, -c_{15-n}\}$$

$$\vdots$$

$$P_{15} = \{0, 0, 0, -c_4, 0, 0, 0, -c_8, 0, 0, 0, -c_{12}, 0, 0, 0, -c_0\}$$

104d

*FIG. 10*

Code book 104e.

| | |
|---|---|
| First reference spectral sequence | {3,0,0,0,−1,0,0,0,−1,0,0,0,−1,0,0,0} |
| Second reference spectral sequence | {2,0,0,0,−2,0,0,0,−1,0,0,0,1,0,0,0} |
| Third reference spectral sequence | {2,0,0,0,2,0,0,0,−1,0,0,0,−1,0,0,0} |
| Fourth reference spectral sequence | {2,0,0,0,1,0,0,0,−1,0,0,0,1,0,0,0} |

*FIG. 11*

Spectral sequence code

Codebook_id = 1
Code_index = 3
Phase = 1

ENCODING APPARATUS AND DECODING APPARATUS

BACKGROUND OF THE INVENTION

1. Field of the Invention

The present invention relates to an encoding apparatus and a decoding apparatus. More particularly, the present invention relates to an encoding apparatus and a decoding apparatus capable of reducing the amount of information in encoding an audio signal while maintaining the sound quality.

2. Description of the Related Art

A number of encoding methods and decoding methods for an audio signal containing a speech or music signal have been developed to date. Among others, a recent method in conformity with IS13818-7, which is internationally standardized by the ISO/IEC, is valued as a high sound-quality and efficient encoding method. This encoding method is called AAC. Recently, AAC has been adopted by the standard called MPEG4 to produce MPEG4-AAC having several extended functions over IS13818-7. An example of the encoding process of MPEG4-AAC is described in INFOMATIVE PART.

An encoding apparatus using a conventional encoding method will be described below.

FIG. 16 is a diagram showing a structure of a conventional encoding apparatus 1600. The encoding apparatus 1600 comprises a spectrum normalization section 1601, a spectrum amplification section 1602, a spectrum quantization section 1603, a Huffman encoding section 1604, and an encoded sequence transfer section 1605.

An audio discrete signal (PCM data) obtained by sampling an audio signal is converted from data on a time domain to frequency spectral data using an orthogonal transformation technique or the like by a time-to-frequency conversion section (not shown). The data on a time domain of an audio signal is discrete data with respect to time, while the frequency spectral data of the audio signal is discrete data with respect to frequency. The frequency spectral data of an audio signal is input to the spectrum normalization section 1601.

An audio signal is divided into a plurality of frequency bands. The spectrum normalization section 1601 receives a frequency spectral sequence which is frequency spectral data in one of the frequency bands, and normalizes the average value of the frequency spectral sequence, using a scale factor, into a specific range to generate a normalized spectral sequence represented by a floating point. A scale factor is, for example, a multiplier coefficient for a power of 2.

The spectrum amplification section 1602 receives the normalized spectral sequence, and corrects each value of the normalized spectral sequence into a value in the specific range using a correction gain to generate an amplified spectral sequence.

The spectrum quantization section 1603 receives the amplified spectral sequence, and quantizes the amplified spectral sequence using a predetermined conversion expression into a quantized spectral sequence. The spectrum quantization section 1603 rounds spectral data represented by a floating point to integer values in the case of quantization in the AAC format.

The Huffman encoding section 1604 converts the quantized spectral sequence to a Huffman code sequence.

The encoded sequence transfer section 1605 transfers a scale factor output from the spectrum normalization section 1601, a correction gain output from the spectrum amplification section 1602, and a Huffman code sequence output from the Huffman encoding section 1604 to an external apparatus 1608. The external apparatus 1608 is, for example, a recording medium or a decoding apparatus.

Recently, it is desired for the compression rate of an audio signal to be increased so as to reduce the amount of encoded information.

The information compression performance of the encoding apparatus 1600 depends on the Huffman encoding section 1604. In the encoding apparatus 1600, to obtain a high compression rate of an audio signal, i.e., a small amount of encoded information, the correction gain of the spectrum amplification section 1602 is controlled in such a manner as to reduce the values of a quantized spectral sequence, such that the amount of information encoded by the Huffman encoding section 1604 is reduced.

With such an operation, however, when the Huffman code sequence is decoded into a frequency spectrum, a very large number of values having a zero amplitude (quantized value) are generated, so that sound quality cannot be sufficiently secured.

SUMMARY OF THE INVENTION

According to one aspect of the present invention, an encoding apparatus comprises a quantized spectral sequence generation section for generating a quantized spectral sequence by quantizing an audio signal with a predetermined quantization precision, and a circulating code vector quantization section for outputting a spectral sequence code containing circulating position identification information indicating how much a reference spectral sequence is circulated to obtain a circulant quantized spectral sequence which is most similar to the quantized spectral sequence.

In one embodiment of this invention, the encoding apparatus further comprises a Huffman encoding section for outputting a Huffman code sequence obtained by converting the quantized spectral sequence, and a encoding switching section for receiving the quantized spectral sequence and switching the output of the quantized spectral sequence between the circulating code vector quantization section and the Huffman encoding section under a predetermined condition.

In one embodiment of this invention, the circulating code vector quantization section includes a code book having a first set of a plurality of circulant quantized spectral sequences obtained by circulating the reference spectral sequence.

In one embodiment of this invention, out of the first set of a plurality of circulant quantized spectral sequences, the circulating code vector quantization section determines a circulant quantized spectral sequence having a largest inner product with the quantized spectral sequence as a circulant quantized spectral sequence most similar to the quantized spectral sequence.

In one embodiment of this invention, out of the first set of a plurality of circulant quantized spectral sequences, the circulating code vector quantization section determines a circulant quantized spectral sequence having a largest modified inner product with the quantized spectral sequence as a circulant quantized spectral sequence most similar to the quantized spectral sequence.

In one embodiment of this invention, the first set of a plurality of circulant quantized spectral sequences are represented by $$P_0=(c_0, c_1, c_2, \ldots, c_{n-1}, c_n)$$

$$P_1=(c_n, c_0, c_1, \ldots, c_{n-2}, c_{n-1})$$

$$P_2=(c_{n-1}, c_n, c_0, \ldots, c_{n-3}, c_{n-2})$$

$$\ldots$$

$$P_n=(c_1, c_2, c_3, \ldots, c_n, c_0)$$

where the reference spectral sequence is $P_0$, elements contained in each of the first set of a plurality of circulant quantized spectral sequences are $c_0, c_1, c_2, \ldots, c_{n-1}, c_n$, and the number of elements of each of the first set of a plurality of circulant quantized spectral sequences is n+1.

In one embodiment of this invention, some of the elements, $c_0, c_1, c_2, \ldots, c_{n-1}, c_n$, contained in each of the first set of a plurality of circulant quantized spectral sequences are zero.

In one embodiment of this invention, some of the elements, $c_0, c_1, c_2, \ldots, c_{n-1}, c_n$, contained in each of the first set of a plurality of circulant quantized spectral sequences are zero at predetermined intervals.

In one embodiment of this invention, the quantized spectral sequence generation section generates the quantized spectral sequence based on a frequency spectral sequence, wherein the frequency spectral sequence is spectral data for one frequency band out of a plurality of frequency bands obtained by dividing the audio signal. The predetermined condition is dependent on a frequency band of the plurality of frequency bands of an audio signal, from which the frequency spectral sequence is derived.

In one embodiment of this invention, when an assigned amount of information for the frequency band of the frequency spectral sequence is large, the encoding switching section outputs the quantized spectral sequence to the Huffman encoding section.

In one embodiment of this invention, when an assigned amount of information for the frequency band of the frequency spectral sequence is small, the encoding switching section outputs the quantized spectral sequence to the circulating code vector quantization section.

In one embodiment of this invention, the code book further contains a second set of a plurality of circulant quantized spectral sequences, wherein each element of the second set of a plurality of circulant quantized spectral sequences has the same absolute value and the opposite sign with respect to a corresponding element of the first set of a plurality of circulant quantized spectral sequences.

In one embodiment of this invention, the first set of a plurality of circulant quantized spectral sequences include circulant quantized spectral sequences obtained by circulating a plurality of reference spectral sequences having the same number of elements as that of the quantized spectral sequence.

According to another aspect of the present invention, a decoding apparatus comprises a circulating code vector inverse quantization section having a reference spectral sequence for generating a quantized spectral sequence based on the reference spectral sequence and an input spectral sequence code, a spectral inverse amplification section for receiving the quantized spectral sequence and subjecting the quantized spectral sequence to inverse amplification using a correction gain to generate an amplified spectral sequence, and a spectral inverse normalization section for receiving the amplified spectral sequence and converting the amplified spectral sequence, using a scale factor, to a frequency spectral sequence. The spectral sequence code contains circulating position identification information indicating how much the reference spectral sequence is circulated to obtain the quantized spectral sequence.

In one embodiment of this invention, the decoding apparatus further comprises a Huffman inverse quantization section for receiving a Huffman code sequence and converting the Huffman code sequence to the quantized spectral sequence, and a decoding switching section for switching the output of the quantized spectral sequence between the circulating code vector inverse quantization section and the Huffman inverse quantization section under a predetermined condition. The encoded sequence includes the Huffman code sequence.

Thus, the invention described herein makes possible the advantages of providing: (1) an encoding apparatus for encoding an audio signal to an encoded sequence having a small amount of information while securing high sound quality; and (2) a decoding apparatus for decoding an encoded sequence to a frequency spectral sequence.

These and other advantages of the present invention will become apparent to those skilled in the art upon reading and understanding the following detailed description with reference to the accompanying figures.

BRIEF DESCRIPTION OF THE DRAWINGS

FIG. 5 is a diagram showing circulant quantized spectral sequences in a code book used in the encoding apparatus of Example 2.

FIG. 7 is a diagram showing circulant quantized spectral sequences in a code book used in the encoding apparatus of Example 3.

FIG. 8 is a diagram showing another set of circulant quantized spectral sequences in a code book used in the encoding apparatus of Example 3.

FIG. 10 is a diagram schematically showing reference spectral sequences contained in a code book used in the encoding apparatus of Example 5.

FIG. 11 is a diagram showing a spectral sequence code of Example 5.

DESCRIPTION OF THE PREFERRED EMBODIMENTS

Hereinafter, encoding apparatuses and decoding apparatuses according to the present invention will be described by way of illustrative examples with reference to the accompanying drawings.

EXAMPLE 1

Figure 1:
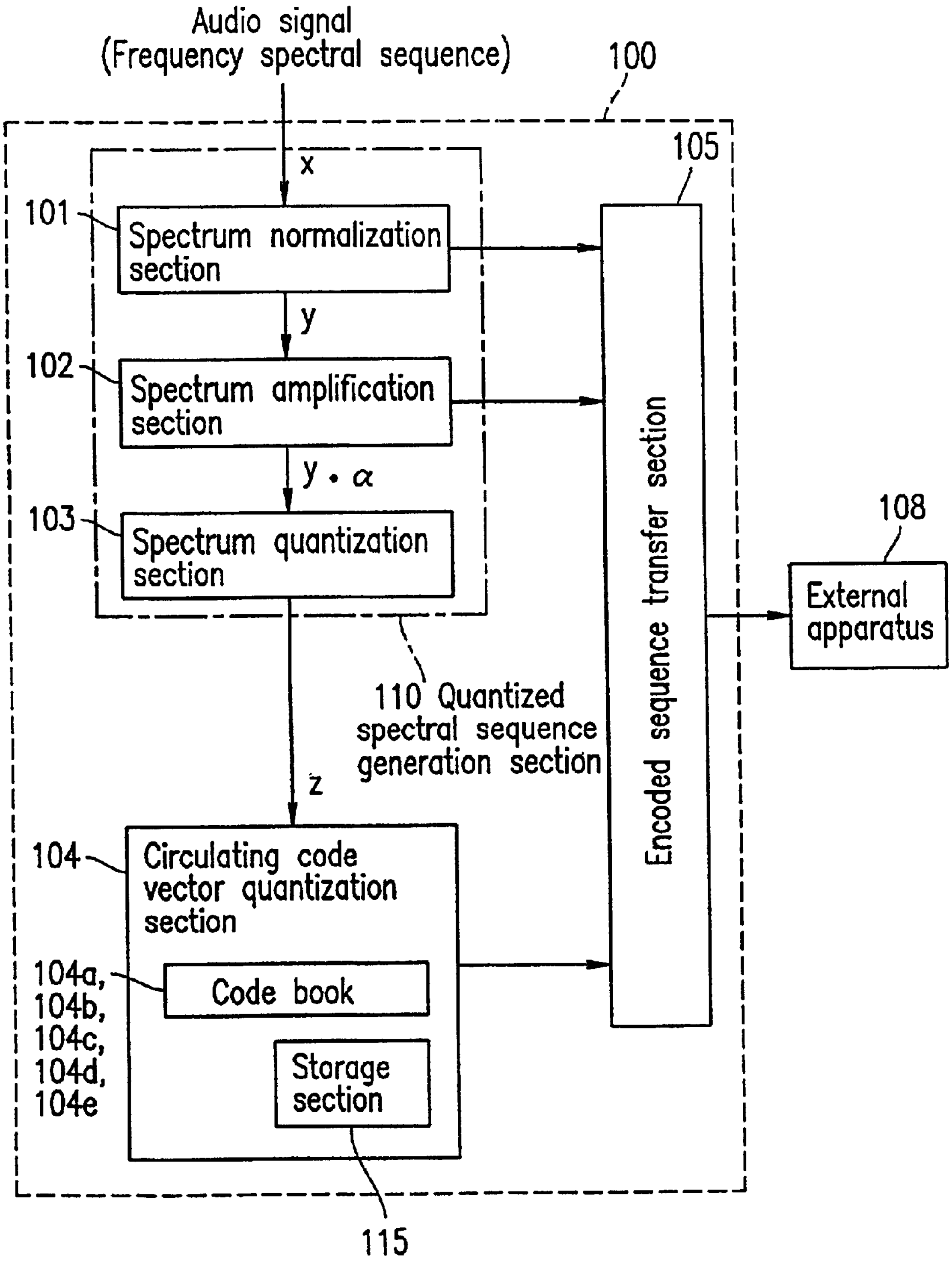
FIG. 1 is a diagram showing a configuration of an encoding apparatus according to any one of Examples 1 to 3 and 5 of the present invention.

FIG. 1 is a diagram showing a configuration of an encoding apparatus 100 according to the present invention. The encoding apparatus 100 comprises a quantized spectral sequence generation section 110 for generating a quantized spectral sequence with a predetermined quantization precision based on an audio signal, a circulating code vector quantization section 104 for generating a spectral sequence code based on the quantized spectral sequence, and an encoded sequence transfer section 105 for transferring outputs from the quantized spectral sequence generation section 110 and/or the circulating code vector quantization section 104 to an external apparatus 108.

The quantized spectral sequence generation section 110 comprises a spectrum normalization section 101, a spectrum amplification section 102, and a spectrum quantization section 103.

The quantized spectral sequence generation section 110 generates a quantized spectral sequence from an audio signal as follows.

An audio discrete signal (PCM data) obtained by sampling an audio signal is converted from data on a time domain to frequency spectral data using an orthogonal transformation technique or the like by a time-to-frequency conversion section (not shown). The data on a time domain of an audio signal is discrete data with respect to time, while the frequency spectral data of the audio signal is discrete data with respect to frequency. The frequency spectral data of an audio signal is input to the spectrum normalization section 101.

The spectrum normalization section 101 receives a frequency spectral sequence x, and normalizes the average value or maximum value of the frequency spectral sequence, using a scale factor, into a specific range to generate a normalized spectral sequence y represented by a floating point. The frequency spectral sequence x contains a predetermined number of spectral data values in one frequency band, where an audio signal is divided into a plurality of frequency bands. A scale factor is, for example, a multiplier coefficient for a power of 2.

The spectrum amplification section 102 corrects each value of the normalized spectral sequence y into a value in a specific range using a correction gain $\alpha$ to generate an amplified spectral sequence $y\cdot\alpha$. The correction gain a is used to correct each value of the normalized spectral sequence y into a value in a specific range for each predetermined frequency band.

The spectrum quantization section 103 quantizes the amplified spectral sequence $y\cdot\alpha$ using a predetermined conversion expression with a predetermined quantization precision into a quantized spectral sequence z. The spectrum quantization section 103 rounds spectral data represented by a floating point to integer values in the case of quantization in the AAC format.

As will be understood by those skilled in the art, in the quantized spectral sequence generation section 110, the number of elements is the same among a frequency spectral sequence, a normalized spectral sequence, an amplified spectral sequence, and a quantized spectral sequence.

In Example 1, the circulating code vector quantization section 104 comprises a code book 104*a* and a storage section 115. The code book 104*a* has a plurality of circulant quantized spectral sequences obtained by circulating a reference spectral sequence having the same number of elements as that of the quantized spectral sequence z. The storage section 115 stores the elements of the code book 104*a*.

The circulating code vector quantization section 104 compares each of a plurality of circulant quantized spectral sequences with the quantized spectral sequence z so as to determine a circulant quantized spectral sequence of the plurality of circulant quantized spectral sequences, which is most similar to the quantized spectral sequence z and outputs a spectral sequence code containing circulating position identification information indicating how much the reference spectral sequence is circulated to match the circulant quantized spectral sequence which is most similar to the quantized spectral sequence z. In this manner, the circulating code vector quantization section 104 converts the quantized spectral sequence z (exactly, the circulant quantized spectral sequence which is most similar to the quantized spectral sequence z) to a spectral sequence code which is in turn output to the encoded sequence transfer section 105.

The encoded sequence transfer section 105 transfers a scale factor output from the spectrum normalization section 101, a correction gain output from the spectrum amplification section 102, and a spectral sequence code output from the circulating code vector quantization section 104 to the external apparatus 108. The external apparatus 108 may be, for example, a recording medium or a decoding apparatus.

The encoded sequence transfer section 105 generates an encoded sequence based on a signal from any one of the spectrum normalization section 101, the spectrum amplification section 102, the spectrum quantization section 103, and the circulating code vector quantization section 104, and outputs a spectral sequence code corresponding the frequency spectral sequence x input to the encoding apparatus 100 to the external apparatus 108. The encoded sequence transfer section 105 may possibly output only a spectral sequence code from the circulating code vector quantization section 104 to the external apparatus 108.

Hereinafter, an operation of the encoding apparatus 100 will be described in more detail.

Audio discrete data (PCM data) is converted by a time-to-frequency conversion section (not shown) to frequency spectral data at predetermined time intervals. This frequency spectral data is divided into a plurality of predetermined frequency bands to generate the frequency spectral sequence x. The frequency spectral sequence x is input to the spectrum normalization section 101.

The spectrum normalization section 101 calculates the energy of the received frequency spectral sequence x for each frequency band, and normalizes the average value of the calculated energy into a specific range. The spectrum normalization section 101 outputs the generated normalized spectral sequence y to the spectrum amplification section 102, and outputs a scale factor to the encoded sequence transfer section 105.

The spectrum amplification section 102 amplifies each value in the normalized spectral sequence y into a predetermined value using a correction gain $\alpha$ to generate an amplified spectral sequence $y\cdot\alpha$. The spectrum amplification section 102 outputs the amplified spectral sequence $y\cdot\alpha$ to the spectrum quantization section 103, and outputs the correction gain $\alpha$ to the encoded sequence transfer section 105.

The spectrum quantization section 103 subjects the amplified spectral sequence $y \cdot \alpha$ to quanization using a predetermined conversion expression. The conversion expression is, for example, represented by $$z_i = (\text{int})(y_i \cdot \alpha) \quad (1)$$

where $z_i$ is an $i^{th}$ element in the quantized spectral sequence z, $y_i$ is an $i^{th}$ element in the normalized spectral sequence y, $\alpha$ is a correction gain which is set for each divided frequency band, and (int) is a function which quantizes the argument into an integer.

In accordance with expression (1), the amplified spectral sequence $y \cdot \alpha$ is converted to the quantized spectral sequence z having integer values. The spectrum quantization section 103 outputs the quantized spectral sequence z to the circulating code vector quantization section 104.

As described above, the circulating code vector quantization section 104 circulates the reference spectral sequence so as to determine a circulant quantized spectral sequence of a plurality of circulant quantized spectral sequences, which is most similar to the quantized spectral sequence z. Such determination may be conducted by calculating the inner product of the quantized spectral sequence z with each of the plurality of circulant quantized spectral sequences. This operation will be described with reference to FIG. 2.

Figure 2:
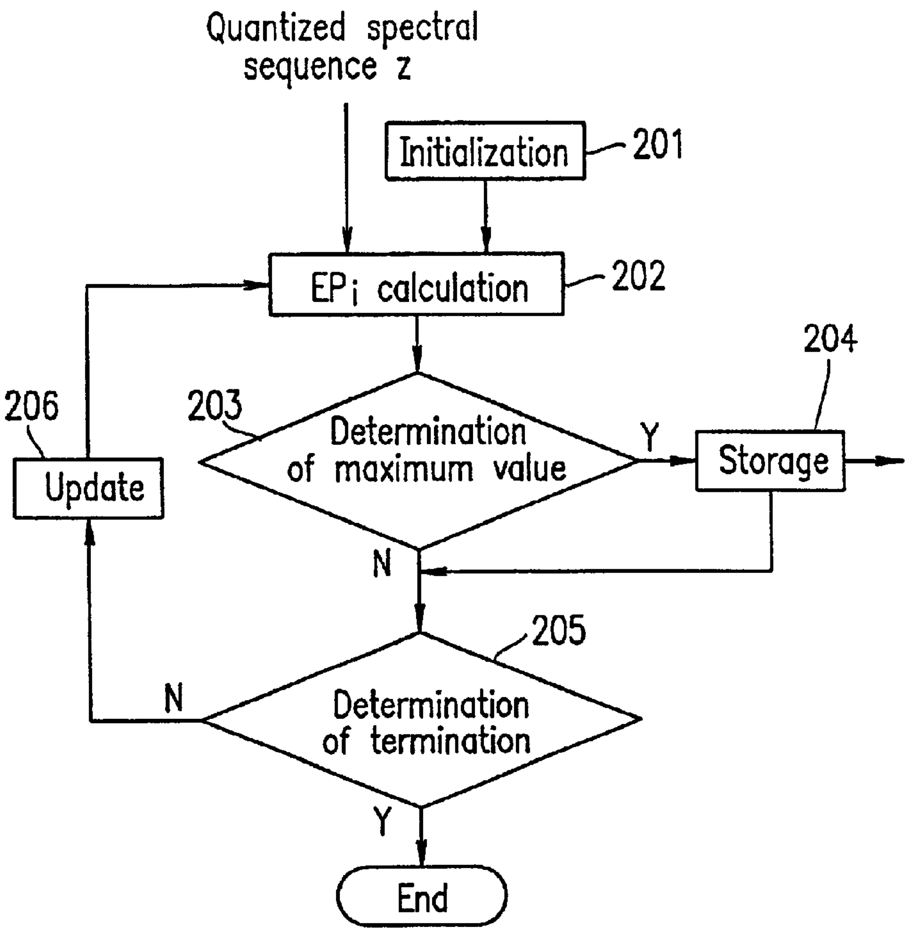
FIG. 2 is a flowchart showing an operation of a circulating code vector quantization section used in the encoding apparatus of any one of Examples 1 to 5.

FIG. 2 is a flowchart showing an operation of the circulating code vector quantization section 104.

When the quantized spectral sequence z is input to the circulating code vector quantization section 104, i and a maximum (max) are set to zero (step 201).

Thereafter, the inner product of the quantized spectral sequence z input from the spectrum quantization section 103 with a circulant quantized spectral sequence contained in the code book 104*a* is calculated (step 202). In this case, the number of elements is the same between the quantized spectral sequence z and the circulant quantized spectral sequence. For example, when the number of elements of the quantized spectral sequence z is 16, the number of elements of the circulant quantized spectral sequence is also 16. The inner product of the quantized spectral sequence z with the circulant quantized spectral sequence indicates the similarity therebetween which is represented by $EP_i$ (i is the number of elements). Hereinafter, a detailed description will be given of the case where a quantized spectral sequence and a reference spectral sequence (i.e., a circulant quantized spectral sequence) each have the number of elements which is 16.

Figure 3:
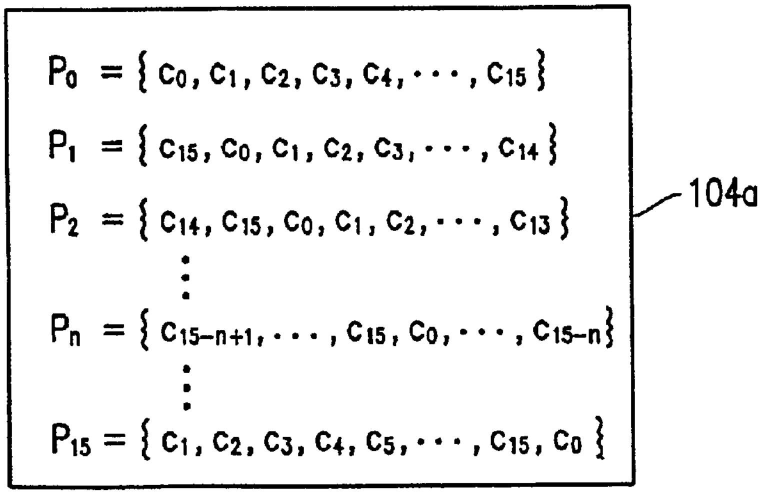
FIG. 3 is a diagram showing circulant quantized spectral sequences in a code book used in the encoding apparatus of Example 1.

FIG. 3 shows circulant quantized spectral sequences in the code book 104*a* used in the encoding apparatus of the present invention. A code indicating the reference spectral sequence is represented by $P_0$. A plurality of circulant quantized spectral sequences obtained by circulating the reference spectral sequence are represented by codes $P_n$.

A plurality of circulant quantized spectral sequences obtained by circulating the reference spectral sequence herein includes the reference spectral sequence itself. The reference spectral sequence is a circulant quantized spectral sequence obtained by circulating the reference spectral sequence zero times.

The code $P_n$ (where n=0, 1, 2, . . . , 15) of FIG. 3 contains 16 elements.

As shown in FIG. 3, the $0^{th}$ code $P_0$ indicates a vector $\{c_0, c_1, c_2, \ldots, c_{15}\}$, the $1^{st}$ code $P_1$ indicates a vector $\{c_{15}, c_0, c_1, \ldots, c_{14}\}$. As describedabove, the code $P_0$ is the reference spectral sequence, and the $1^{st}$ code $P_1$ is obtained by the code $P_0$ being shifted by one element to the right and an element $c_{15}$ at the $15^{th}$ position of the code $P_0$ being circulated to be placed at the $0^{th}$ position of the code $P_1$. The codes $P_2$ to $P_{15}$ are obtained by each element of the code $P_0$ being circulated by corresponding counts. Therefore, if all elements of the code $P_0$ are determined, the other codes $P_1$ to $P_{15}$ are uniquely determined.

Although in FIG. 3 a plurality of circulant quantized spectral sequences are circulated to the right, the present invention is not limited to this and the direction may be left.

In step 202, the inner product $EP_i$ of the quantized spectral sequence z with a circulant quantized spectral sequence is calculated by $$EP_0 = z \cdot P_0 = c_0 z_0 + c_1 z_1 + \ldots + c_{15} z_{15}$$
$$EP_1 = z \cdot P_1 = c_{15} z_0 + c_0 z_1 + \ldots + c_{14} z_{15}$$
$$EP_2 = z \cdot P_2 = c_{14} z_0 + c_{15} z_1 + \ldots + c_{13} z_{15}$$
$$\ldots$$
$$EP_{15} = z \cdot P_{15} = c_1 z_0 + c_2 z_1 + \ldots + c_0 z_{15} \quad (2)$$

where $EP_n$ (n=0, 1, 2, . . . , 15) is the inner product of each code $P_n$ (n=0, 1, 2, . . . , 15) with the quantized spectral sequence z having elements $z_n$ (n=0, 1, 2, . . . , 15).

In step 203, the circulating code vector quantization section 104 determines whether or not a result of the calculation in step 202 is so far the largest value. The maximum value determination in step 203 is, for example, executed by

```
if (max<=EPi)    {                    (3)
      max=EPi
      ncode=i
}
```

where ncode is a circulation count i when $EP_i$ takes the maximum value (max).

When it is determined in step 203 that a calculation result of step 202 is maximum (branch Y in step 203), the process goes to step 204. In step 204, the current $EP_i$ is updated as the maximum (max). Further, the circulation count i is stored in the storage section 115 of the circulating code vector quantization section 104. The circulation count i may be stored in any storage section of the circulating code vector quantization section 104. Thereafter, the process goes to step 205.

When it is determined in step 203 that a calculation result in step 202 is not maximum (branch N in step 203), the process goes to step 205.

When i is zero, the maximum value (max) is initialized to zero in step 201. Therefore, $EP_0$ is determined to be maximum in step 203, and is stored in the storage section 115 of the circulating code vector quantization section 104 in step 204.

In step 205, it is determined whether or not all of the plurality of circulant quantized spectral sequences obtained by circulating the reference spectral sequence have been calculated. Specifically, whether or not i is maximum is determined in step 205.

When i is maximum (branch Y in step 205), this operation is ended.

When i is not maximum (branch N in step 205), i is increment by one in step 206, and the process returns to step 202.

Thereafter, the circulating code vector quantization section 104 repeats the operations of steps 202 to 206 for the incremented i.

When it is determined in step 205 that all of the plurality of circulant quantized spectral sequences obtained by circulating the reference spectral sequence have been calculated, i.e., i has reached the maximum value (branch Y in step 205), the circulating code vector quantization section 104 outputs the circulation count i of the maximum $EP_i$ stored in step 204 as a spectral sequence code to the encoded sequence transfer section 105. In this case, the circulation count i means that a circulant quantized spectral sequence which is most similar to the quantized spectral sequence z is obtained by circulating the reference spectral sequence by i elements, and is herein referred to as circulating position identification information. In the above description, since the number of elements in the quantized spectral sequence z is 16, the circulation count i takes 16 values. Therefore, the circulating position identification information is represented by 4-bit codes.

Figure 4:
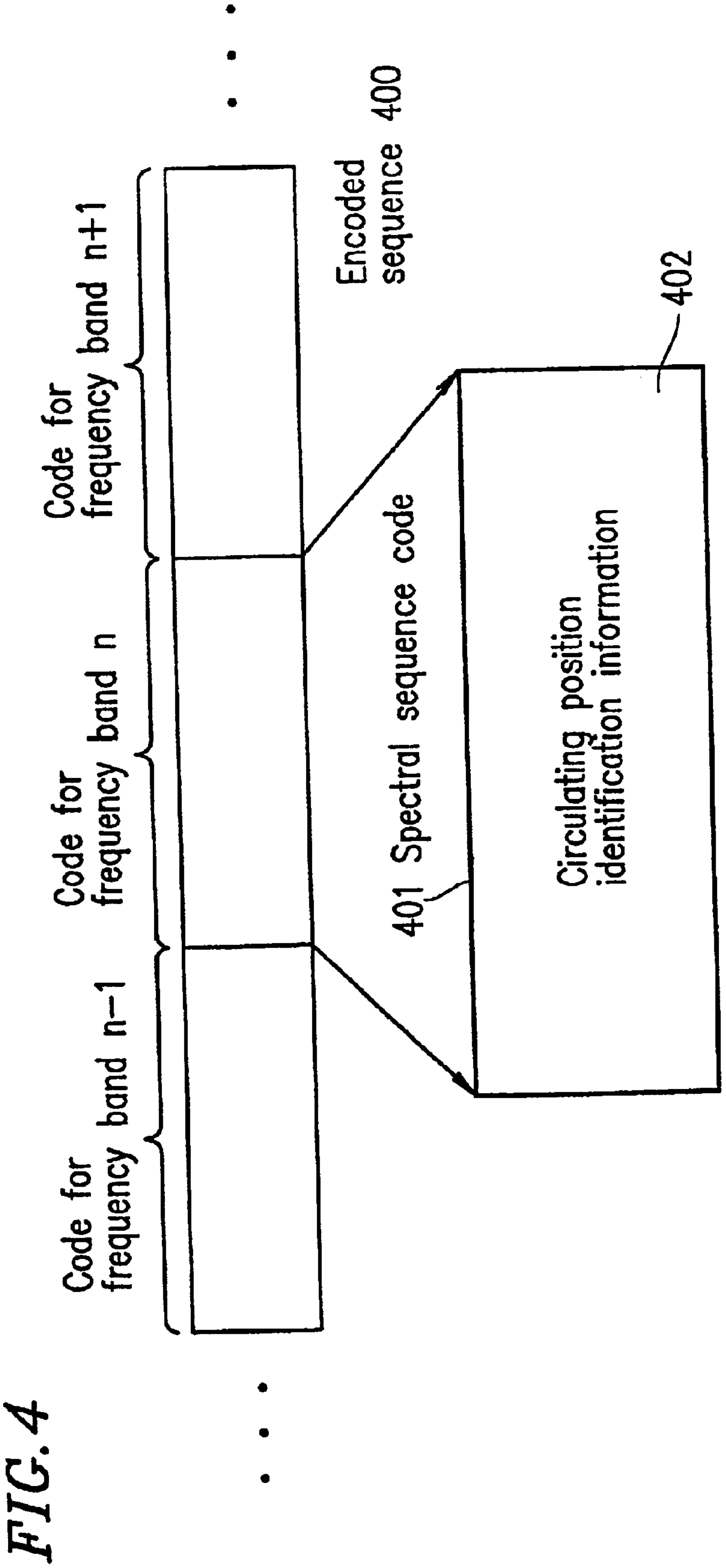
FIG. 4 is a diagram showing a structure of an encoded sequence in Example 1.

FIG. 4 shows an exemplary structure of an encoded sequence 400 output from the encoded sequence transfer section 105 to the external apparatus 108. The encoded sequence 400 typically includes spectral sequence codes successively encoded from a lower frequency band to a higher frequency band. Hereinafter, the encoded sequence 400 corresponding to a frequency band n, i.e., a spectral sequence code 401, will be described.

The spectral sequence code 401 contains circulating position identification information 402 corresponding to the frequency band n. In this case, when the number of elements in a quantized spectral sequence is 16 as described above, the circulating position identification information can be represented by 4 bits.

Further, the spectral sequence code 401 as a code for the frequency band n may contain a scale factor output from the spectrum normalization section 101 and a correction gain output from the spectrum amplification section 102.

With the thus-constructed encoding apparatus, encoding can be performed using a smaller fixed number of bits. Further, since each code (circulant quantized spectral sequence) in the code book **104*a* is generated by circulation, an encoding apparatus and a decoding apparatus (e.g., the storage section 115 in the circulating code vector quantization section 104**) need to have only 16 elements, i.e., $c_0$, $c_1$, . . . , $c_{15}$. Therefore, the capacity of a storage section for storing elements can be reduced.

Although in the above description the case where a quantized spectral sequence and a circulant quantized spectral sequence each contain 16 elements, the present invention is not limited to this. A quantized spectral sequence and a circulant quantized spectral sequence each may contain any number of elements.

In the above description, to determine a circulant quantized spectral sequence which is most similar to the quantized spectral sequence z, the inner product therebetween is calculated. The present invention is not limited to this. For example, a modified inner product function may be used. The modified inner product function as used herein refers to an inner product function in which a weight coefficient is assigned to each term. Specifically, a modified vector inner product function $EP_i$ of a quantized spectral sequence z with a circulant quantized spectral sequence is calculated by (step 202 of FIG. 2)

$$EP_0' = 3c_0z_0 + 2c_1z_1 + \ldots + 0.3c_{15}z_{15}$$

$$EP_1' = 3c_{15}z_0 + 2c_0z_1 + \ldots + 0.3c_{14}z_{15}$$

$$EP_2' = 3c_{14}z_0 + 2c_{15}z_1 + \ldots + 0.3c_{13}z_{15}$$

$$\ldots$$

$$EP_{15}' = 3c_1z_0 + c_2z_1 + \ldots + 0.3c_0z_{15} \quad (4)$$

where $EP_n'$ (n=0, 1, 2, . . . , 15) is the modified inner product of each code $P_n$ (n=0, 1, 2, . . . , 15) with the quantized spectral sequence z having elements $z_n$ (n=0, 1, 2, . . . , 15).

In a normal inner product, since all weight coefficients are one, the importance of all frequency spectral data in one frequency band are the same. However, as shown in expression (4), the importance of frequency spectral data can be changed in one frequency band in a modified inner product function. For example, when a lower frequency is considered to be of more importance, the weight coefficient for data having the lower frequency may be larger.

EXAMPLE 2

Next, an encoding apparatus according to Example 2 of the present invention will be described. The encoding apparatus of Example 2 is the same as the encoding apparatus of Example 1 except for the operations of the circulating code vector quantization section 104 (steps 203 and 204).

In step 203 of Example 2 (see FIG. 2), the determination of a maximum value is conducted by

```
if (max<=abs (EPi))    {                    (5)
    max=abs (EPi)
    ncode=i
    if (EPi<0)    {
        face=1
    } else {
        face=0
    }
}
```

where abs( ) is a function which outputs the absolute value of the argument, and a variable face indicates whether or not the value of a code is reversed. The face is herein referred to as phase identification information. In expression (5), when the variable face=1, one of the codes in a code book **104*b* shown in FIG. 5 is most similar to a quantized spectral sequence, and when the variable face=0, one of the codes in the code book 104*a* shown in FIG. 3** is most similar to the quantized spectral sequence.

The values of ncode and face are stored in step 204 of FIG. 2.

As described above, a circulation count i, at which the absolute value of an inner product calculated in step 202, but not the inner product itself, takes a maximum value, is obtained in step 203. This means that codes in the code book **104*b* of FIG. 5 are calculated while codes in the code book 104*a* of FIG. 3 are calculated. This is because each element of a code in the code book 104*b* is of opposite sign with respect to the corresponding element of a code in the code book 104*a* of FIG. 3. The calculation of expression (5) leads to a significant reduction in calculation time compared with the case where the codes in the code books 104*a* and 104*b*** are successively calculated.

The circulating code vector quantization section 104 of Example 2 has the code books **104*a* and 104*b*. Each code in the code book 104*b* has elements, of which each is of opposite sign with respect to the corresponding element of a code in the code book 104*a* of FIG. 3**.

Figure 6:
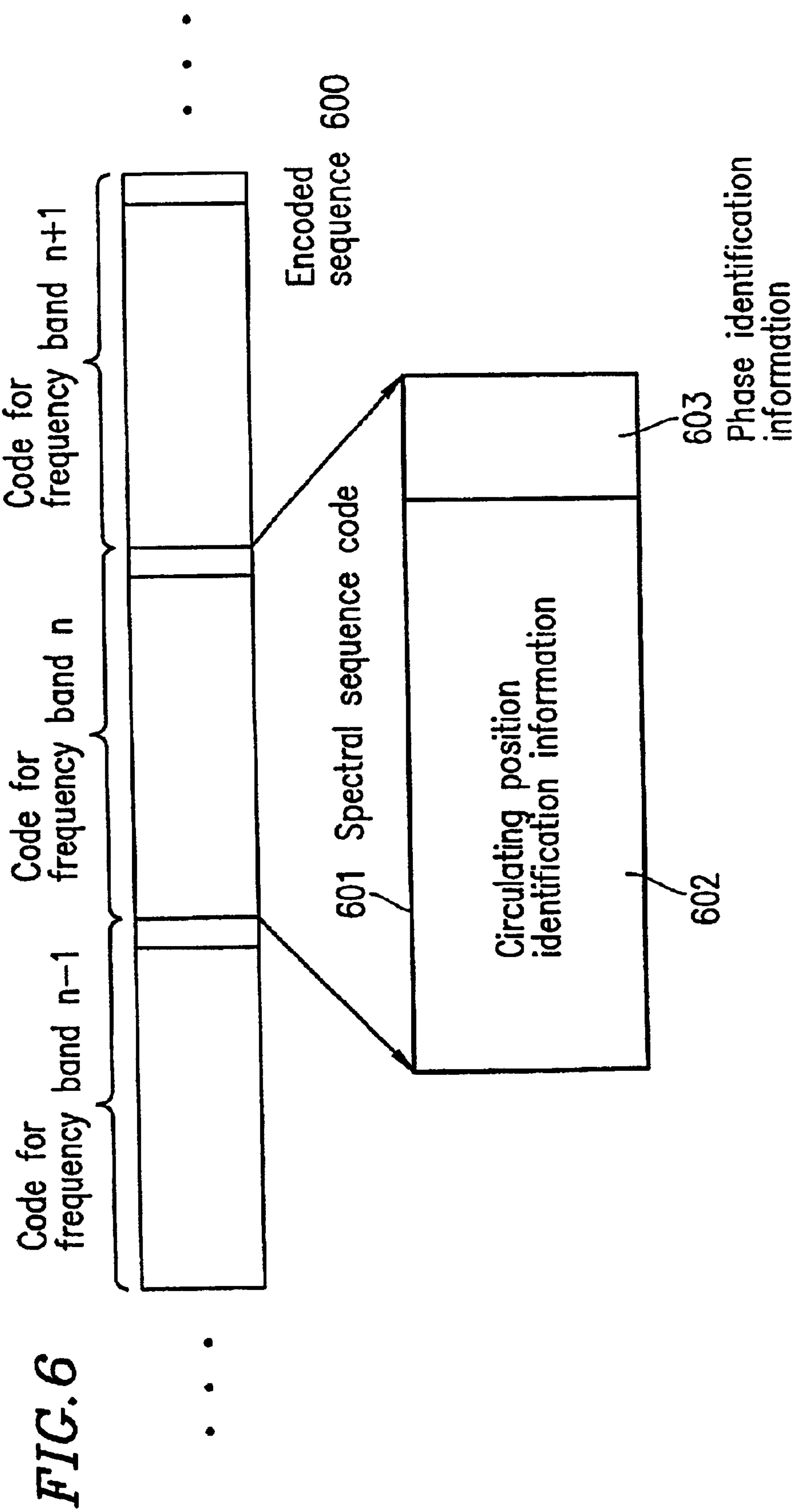
FIG. 6 is a diagram showing a structure of an encoded sequence in Example 2.

FIG. 6 shows an exemplary structure of an encoded sequence 600 output from the encoded sequence transfer section 105 to the external apparatus 108 (also see FIG. 1). The encoded sequence 600 typically contains spectral sequence codes successively encoded from a lower frequency band to a higher frequency band. Hereinafter, the encoded sequence 600 corresponding to a frequency band n, i.e., a spectral sequence code 601, will be described.

The spectral sequence code 601 contains a circulating position identification information 602 and a phase identification information 603 corresponding to the frequency band n. In this case, when the number of elements in a quantized spectral sequence is 16 as described above, circulating position identification information can be represented by 4 bits and phase identification information can be represented by one bit.

Further, the spectral sequence code 601 as a code for the frequency band n may further contain a scale factor output from the spectrum normalization section 101 and a correction gain output from the spectrum amplification section 102.

In the thus-constructed encoding apparatus of Example 2, the amount of calculation is increased only in step 203 as compared in Example 1. Further, the number of bits assigned to the phase identification information 603 is only increased by one in view of the spectral sequence code 601. When the number of elements is 16, Example 2 requires only 5 bits.

Thus, in Example 2, encoding can be conducted using a smaller fixed number of bits. Further, since a plurality of circulating quantization spectral sequences contained in the code book 104*b* are obtained by reversing the signs of all elements in the circulant quantized spectral sequences in the code book 104*a* generated by circulating the reference spectral sequence, an encoding apparatus and a decoding apparatus (e.g., the storage section 115 in the circulating code vector quantization section 104) need to have only 16 elements, i.e., $c_0, c_1, \ldots, c_{15}$. Therefore, the capacity of a storage section for storing elements can be reduced.

EXAMPLE 3

Next, an encoding apparatus according to Example 3 of the present invention will be described. The encoding apparatus of Example 3 is the same as the encoding apparatus of Example 2 except for a code book 104*c* and an operation in step 202.

FIG. 7 shows the code book 104*c* of the circulating code vector quantization section 104 of Example 3. The code book 104*c* of Example 3 is characterized in that some of elements $c_0, c_1, \ldots, c_{n-1}, c_n$ are set to zero at predetermined intervals. In an example of FIG. 7, $c_1$, $c_2$, $c_3$, $c_5$, $c_6$, $c_7$, $c_9$, $c_{10}$, $c_{11}$, $c_{13}$, $c_{14}$, and $c_{15}$ are set to zero. Therefore, calculation in step 202 is simplified by $$EP_0=z\cdot P_0=c_0z_0+c_4z_4+c_8z_8+c_{12}z_{12}$$

$$EP_1=z\cdot P_1=c_0z_1+c_4z_5+c_8z_9+c_{12}z_{13}$$

$$EP_2=z\cdot P_2=c_0z_2+c_4z_6+c_8z_{10}+c_{12}z_{14}$$

$$\ldots$$

$$EP_{15}=z\cdot P_{15}=c_0z_{15}+c_4z_3+c_8z_7+c_{12}z_{11}. \tag{6}$$

Therefore, the amount of calculation in step 202 can be reduced by a factor of 4 as compared to Example 2.

With the thus-constructed encoding apparatus, encoding can be performed using a smaller fixed number of bits. Further, since each code in the code book 104*c* has a circulative structure and only four elements ($c_0$, $C_4$, $C_8$, $c_{12}$) have values, an encoding apparatus and a decoding apparatus only need to have four valued elements (e.g., the storage section 115 in the circulating code vector quantization section 104). Therefore, the capacity of a storage section for storing elements can be reduced.

Further, in Example 3 as well as Example 2, the code book in the circulating code vector quantization section 104 may contain codes as indicated in a code book 104*d* shown in FIG. 8 in addition to the code book 104*c*.

Although in the above description, some elements consecutively have zero values, the present invention is not limited to this. At least any one of elements in a circulant quantized spectral sequence may have a zero value.

Further, although in the above description the number of elements in a circulant quantized spectral sequence is 16, the present invention is not limited to this. The circulant quantized spectral sequence may have any number of elements.

EXAMPLE 4

Next, an encoding apparatus according to Example 4 of the present invention will be described. The encoding apparatus of Example 4 is the same as the encoding apparatus 100 of Example 1 except that the encoding apparatus of Example 4 comprises a Huffman encoding section and an encoding switching section.

Figure 9:
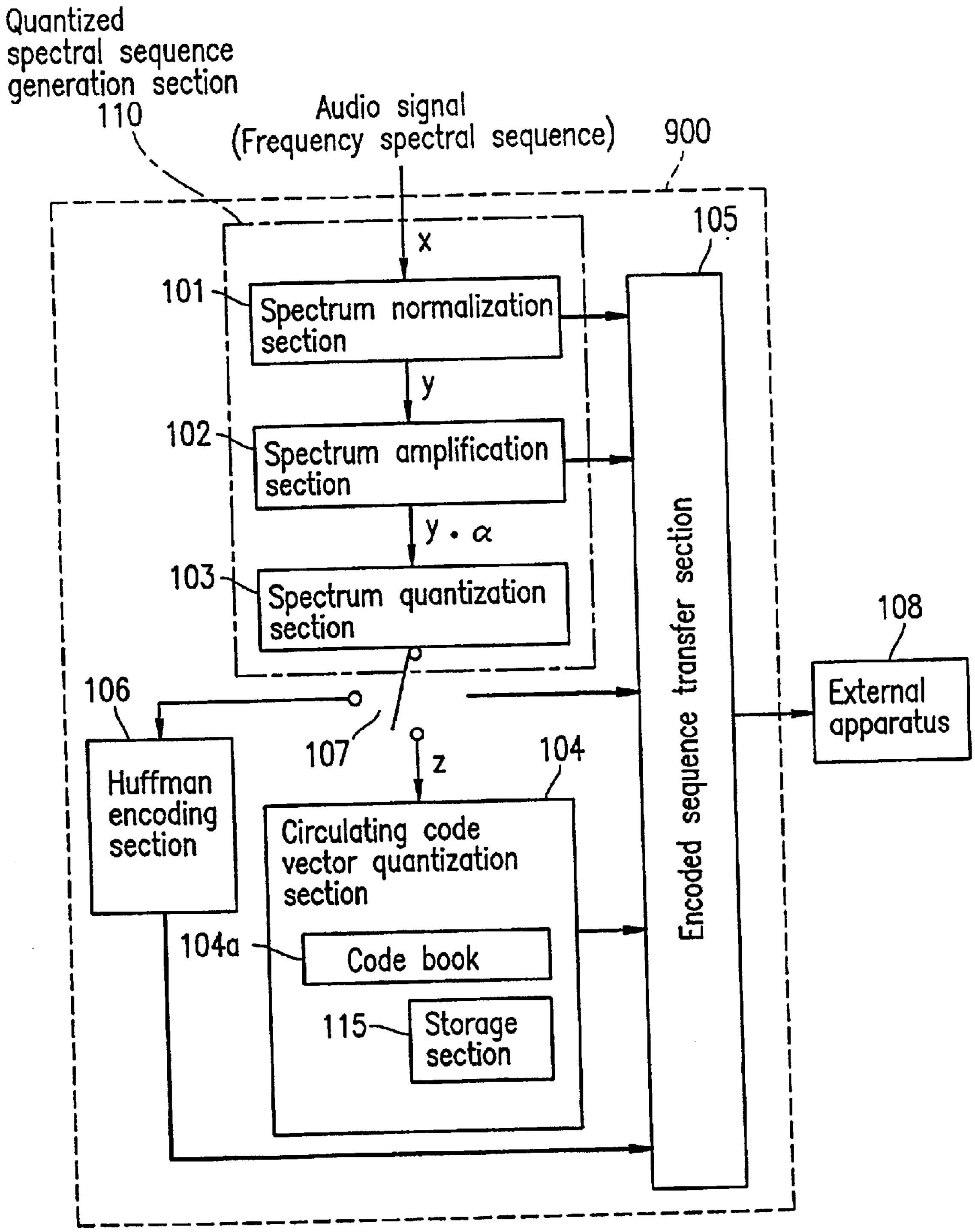
FIG. 9 is a diagram showing a configuration of an encoding apparatus according to Example 4 of the present invention.

FIG. 9 is a diagram showing a configuration of an encoding apparatus 900 of Example 4. The encoding apparatus 900 comprises a quantized spectral sequence generation section 110, a circulating code vector quantization section 104, an encoded sequence transfer section 105, a Huffman encoding section 106, and an encoding switching section 107. The quantized spectral sequence generation section 110 comprises a spectrum normalization section 101, a spectrum amplification section 102, and a spectrum quantization section 103.

The quantized spectral sequence generation section 110 (the spectrum normalization section 101, the spectrum amplification section 102, and the spectrum quantization section 103), the circulating code vector quantization section 104, the encoded sequence transfer section 105, and the external apparatus 108 are the same as those of the encoding apparatus 100 of FIG. 1, and descriptions thereof are thus omitted.

The encoding switching section 107 switches between Huffman encoding and a conversion to a circulant quantized spectral sequence for a quantized spectral sequence z obtained by the spectrum quantization section 103, based on a predetermined condition. In this case, the encoding switching section 107 notifies the encoding method to the encoded sequence transfer section 105.

When the encoding switching section 107 performs switching in such a manner that the quantized spectral sequence z is input to the Huffman encoding section 106, the Huffman encoding section 106 converts the quantized spectral sequence z to a Huffman code sequence. The Huffman encoding section 106 subjects a plurality of quantized spectra $z_i$ together to Huffman encoding. When a Huffman code sequence encoded by Huffman encoding is decoded, a decoding apparatus can perfectly recover the quantized spectra $z_i$ (lossless decoding).

When the encoding switching section 107 performs switching in such a manner that the quantized spectral sequence z is input to the circulating code vector quantization section 104, the circulating code vector quantization section 104 converts the quantized spectral sequence z to a circulant quantized spectral sequence which is most similar to the quantized spectral sequence z. The circulant quantized spectral sequence which is most similar to the quantized spectral sequence z is generated as described in Examples 1 to 3.

With the thus-constructed structure, when an audio signal is divided into a plurality of frequency bands and a frequency spectral sequence is encoded for each frequency band, the encoding switching section 107 switches the input of a quantized spectral sequence between the circulating code vector quantization section 104 and the Huffman encoding section 106 based on a predetermined condition. The above-described predetermined condition is dependent on a frequency band of the plurality of frequency bands of an audio signal, from which the quantized spectral sequence is derived. When the assigned amount of information required for encoding is small (i.e., when the frequency band has less influence on the auditory sensation of a listener), the encoding switching section 107 performs switching in such a manner that the quantized spectral sequence z is output to the circulating code vector quantization section 104. When the assigned amount of information required for encoding is large (i.e., when the frequency band has much influence on the auditory sensation of a listener), the encoding switching section 107 performs switching in such a manner that the quantized spectral sequence z is output to the Huffman encoding section 106.

Therefore, even when a certain amount of loss occurs in decoding in the circulating code vector quantization section 104 since the similarity between the quantized spectral sequence z and a circulant quantized spectral sequence which is most similar to the quantized spectral sequence z is not large, frequency bands of interest have less information on the auditory sensation of a listener. Further, it is possible to perform encoding with a small amount of information while maintaining sound quality.

EXAMPLE 5

Next, an encoding apparatus according to Example 5 of the present invention will be described. The encoding apparatus of Example 5 is the same as that of Example 3 except for the contents of a code book 104*e* and an operation in step 202.

In Examples 1 to 4, a plurality of circulant quantized spectral sequences contained in the code books 104*a*, 104*b*, 104*c*, and 104*d* are circulant quantized spectral sequences obtained by circulating a single reference spectral sequence. The present invention is not limited to this. In Example 5, a description will be given of the case where the code book 104*e* contains circulant quantized spectral sequences obtained by circulating a plurality of reference spectral sequences.

FIG. 10 schematically shows the code book 104*e* containing four reference spectral sequences. Although the code book 104*e* contains a plurality of circulant quantized spectral sequences obtained by circulating four reference spectral sequences, only the reference spectral sequences are shown for the sake of simplicity.

In this case, it is assumed that a circulant quantized spectral sequence which is most similar to the quantized spectral sequence z is a spectrum which is obtained by circulating a second reference spectral sequence by three elements and reversing the signs of all elements. As shown in FIG. 10, the second reference spectral sequence is {2, 0, 0, 0, −2, 0, 0, 0, −1, 0, 0, 0, 1, 0, 0, 0}. If the second reference spectral sequence is circulated by three elements and the signs of all elements thereof are reversed, the resultant circulant quantized spectral sequence is {0, 2, 0, 0, 0, 1, 0, 0, 0, −1, 0, 0, 0, −2, 0, 0}. Therefore, the circulant quantized spectral sequence which is most similar to the quantized spectral sequence z is {0, 2, 0, 0, 0, 1, 0, 0, 0, −1, 0, 0, 0, −2, 0, 0}.

FIG. 11 shows a corresponding spectral sequence code where Codebook_id represents reference spectral sequence identification information, Code_index represents circulating position identification information, and Phase represents phase identification information. The reference spectral sequence identification information indicates a reference spectral sequence in the code book 104*e* from which a circulant quantized spectral sequence indicated by a spectral sequence code is derived. The circulating position identification information indicates the number of elements by which the reference spectral sequence is circulated to obtain a circulant quantized spectral sequence indicated by a spectral sequence code. The phase identification information indicates whether or not a circulant quantized spectral sequence indicated by a spectral sequence code corresponds to a spectral sequence obtained by reversing the signs of all elements on a reference spectral sequence.

Figure 12:
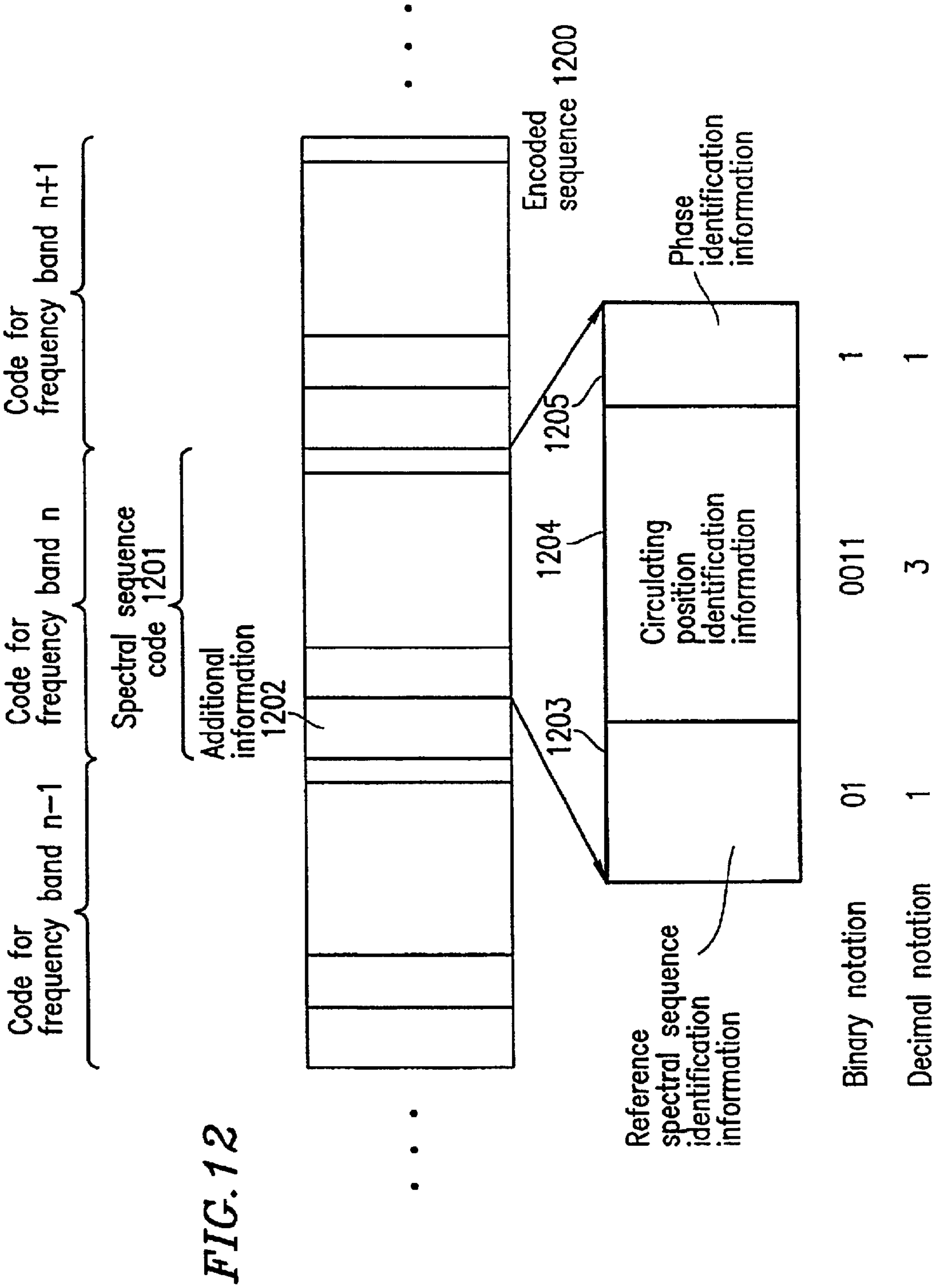
FIG. 12 is a diagram showing a structure of an encoded sequence in Example 5.

FIG. 12 shows an exemplary structure of an encoded sequence 1200 output from the encoded sequence transfer section 105 to the external apparatus 108. The encoded sequence 1200 typically contains a spectral sequence code encoded successively from a lower frequency band to a higher frequency band. Hereafter, the encoded sequence 1200 corresponding to a frequency band n, i.e., a spectral sequence code 1201 will be described.

The spectral sequence code 1201 contains, additional information 1202, reference spectral sequence identification information 1203, circulating position identification information 1204, and phase identification information 1205, corresponding to a frequency band n. As described above, when the code book 104*e* has four reference spectral sequences, the reference spectral sequence identification information 1203 is represented by 2 bits. When the number of elements in a frequency spectral sequence is 16, the circulating position identification information 1204 is represented by 4 bits. The phase identification information 1205 is represented by one bit.

In the above-described example, the reference spectral sequence identification information 1203, the circulating position identification information 1204, and the phase identification information 1205 are represented by 1, 3, and 1, respectively in decimal notation. Therefore, these are represented by 01, 0011, 1, respectively, in binary notation.

Further, the spectral sequence code 1201 may contain a scale factor output from the spectrum normalization section 101 and/or a correction gain output from the spectrum amplification section 102 as the additional information 1202 and a code for the frequency band n.

EXAMPLE 6

Next, a decoding apparatus according to Example 6 of the present invention will be described. The decoding apparatus of Example 6 receives an encoded sequence generated by the encoding apparatus of any one of Example 1 to 3, and 5, and decodes the encoded sequence to obtain an audio signal.

Figure 13:
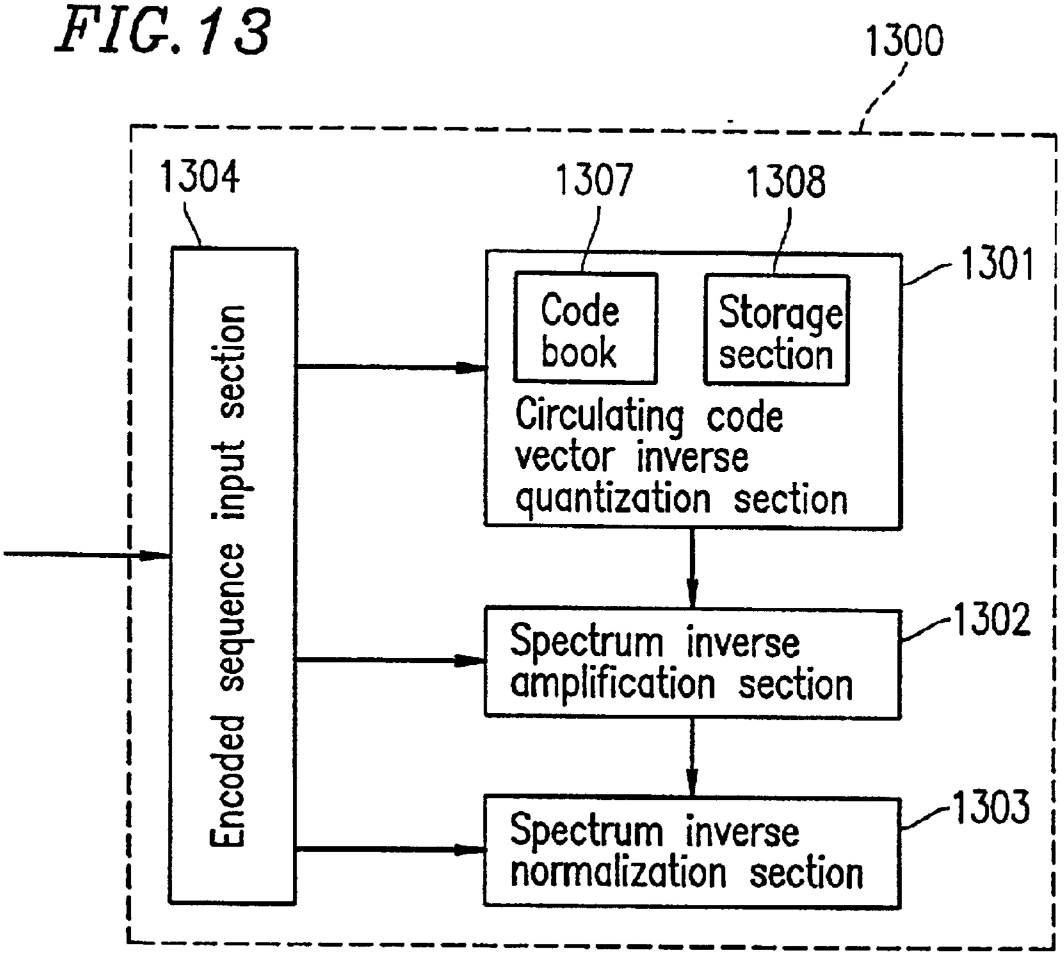
FIG. 13 is a diagram showing a configuration of a decoding apparatus according to Example 6 of the present invention.

FIG. 13 is a block diagram showing a configuration of a decoding apparatus 1300 according to Example 6 of the present invention. The decoding apparatus 1300 comprises a circulating code vector inverse quantization section 1301, a spectrum inverse amplification section 1302, a spectrum inverse normalization section 1303, and an encoded sequence input section 1304.

The encoded sequence input section 1304 comprises a code book 1307 and a storage section 1308. The code book 1307 contains the same codes as those used in producing an encoded sequence input to the encoded sequence input section 1304. Therefore, the code book 1307 contains a reference spectral sequence, and a plurality of circulant quantized spectral sequences obtained by circulating the reference spectral sequence. The storage section 1308 stores each element of the codes in the code book 1307.

In a certain case, the encoded sequence input section 1304 receives an encoded sequence output by the encoding apparatus 100. The encoded sequence input section 1304 extracts circulating position identification information, which has been obtained by encoding a circulating quantized spectral sequence, from the received encoded sequence. Further, when the encoded sequence contains a scale factor used in the spectrum normalization section 101 and/or a correction gain used in the spectrum amplification section 102, the encoded sequence input section 1304 extracts the scale factor and/or the correction gain.

The circulating code vector inverse quantization section 1301 selects a circulant quantized spectral sequence as a quantized spectral sequence from the circulant quantized spectral sequences in the code book 1307, based on the circulating position identification information received from the encoded sequence input section 1304, and recovers spectral sequence code data.

Now, it is assumed that the code book 1307 is the same as the code book 104*a* of FIG. 3. For example, when the value i of the circulating position identification information is one, a corresponding circulant quantized spectral sequence in the code book 1307 is $\{c_{15}, c_0, c_1, \ldots, c_{13}, c_{14}\}$. Therefore, the quantized spectral sequence $\{c_{15}, c_0, c_1, \ldots, c_{13}, c_{14}\}$ is output to the spectrum inverse amplification section 1302.

The spectrum inverse amplification section 1302 subjects the spectral sequence received from the spectrum inverse amplification section 1302 to inverse amplification using a correction gain received from the encoded sequence input section 1304 to generate an inverse amplified spectral sequence. Specifically, if the correction gain received from the encoded sequence input section 1304 is $\alpha$, the amplification factor is $1/\alpha$.

The spectrum inverse normalization section 1303 multiplies each element of the inverse amplified spectral sequence by a scale factor received from the encoded sequence input section 1304 into an original level in each spectrum.

Spectral data for one frequency band indicating an original level obtained by the spectrum inverse normalization section 1303 is arranged from a lower frequency range to a higher frequency range and is used as the frequency spectral data of an audio signal. Thereafter, the frequency spectral data is converted to data on a time domain, i.e., PCM data using a frequency-to-time conversion section (not shown). Further, the PCM data is subjected to D/A conversion to generate an analog audio signal.

Although in the above description, a spectral sequence code contains only circulating position identification information. The present invention is not limited to this. Hereinafter, a description will be given of the case where the circulating code vector inverse quantization section 1301 generates a circulant quantized spectral sequence (i.e., a quantized spectral sequence) indicated by a spectral sequence code based on the spectral sequence code containing reference spectral sequence identification information and phase identification information in addition to circulating position identification information.

Figure 14:
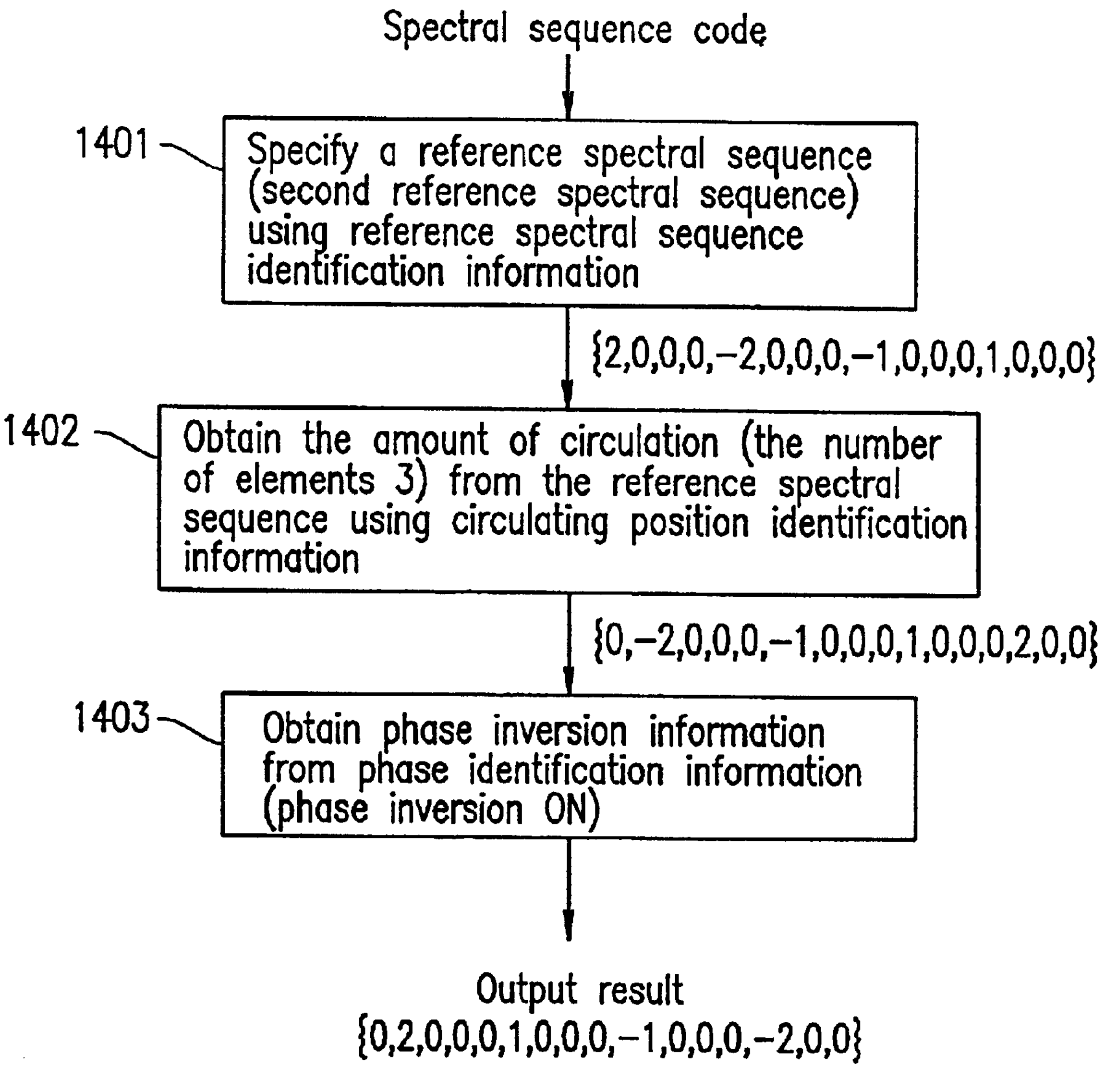
FIG. 14 is a flowchart showing an operation of a circulating code vector inverse quantization section used in the decoding apparatus of Example 6.

FIG. 14 is a flowchart showing an operation of the circulating code vector inverse quantization section 1301 used in the decoding apparatus 1300. The circulating code vector inverse quantization section 1301 generates a quantized spectral sequence based on the spectral sequence code 1201 (FIG. 12).

The circulating code vector inverse quantization section 1301 specifies a reference spectral sequence contained in the code book 1307 of the circulating code vector inverse quantization section 1301 based on reference spectral sequence identification information (step 1401 ). In this case, the code book 1307 is the same as the code book 104*d* of FIG. 10. As shown in FIG. 12, the value of the reference spectral sequence identification information is 1 in decimal notation (01 in binary notation). This means that the reference spectral sequence identification information is a second reference spectral sequence.

In step 1402, the circulating code vector inverse quantization section 1301 obtains the number of elements, by which a reference spectral sequence is to be circulated so as to obtain a quantized spectral sequence, based on the circulating position identification information. The circulating position identification information is 3 in decimal notation (0011 in binary notation) as shown in FIG. 12.

The circulating code vector inverse quantization section 1301 obtains phase inversion information from the phase identification information in step 1403. The phase identification information is 1 in decimal information (1 in binary information) as shown in FIG. 12.

As described above, the circulating code vector inverse quantization section 1301 of the decoding apparatus 1300 generates a quantized spectral sequence {0, 2, 0, 0, 0, 1, 0, 0, 0, −1, 0, 0, 0, −2, 0, 0} based on the spectral sequence code 1201.

EXAMPLE 7

Figure 15:
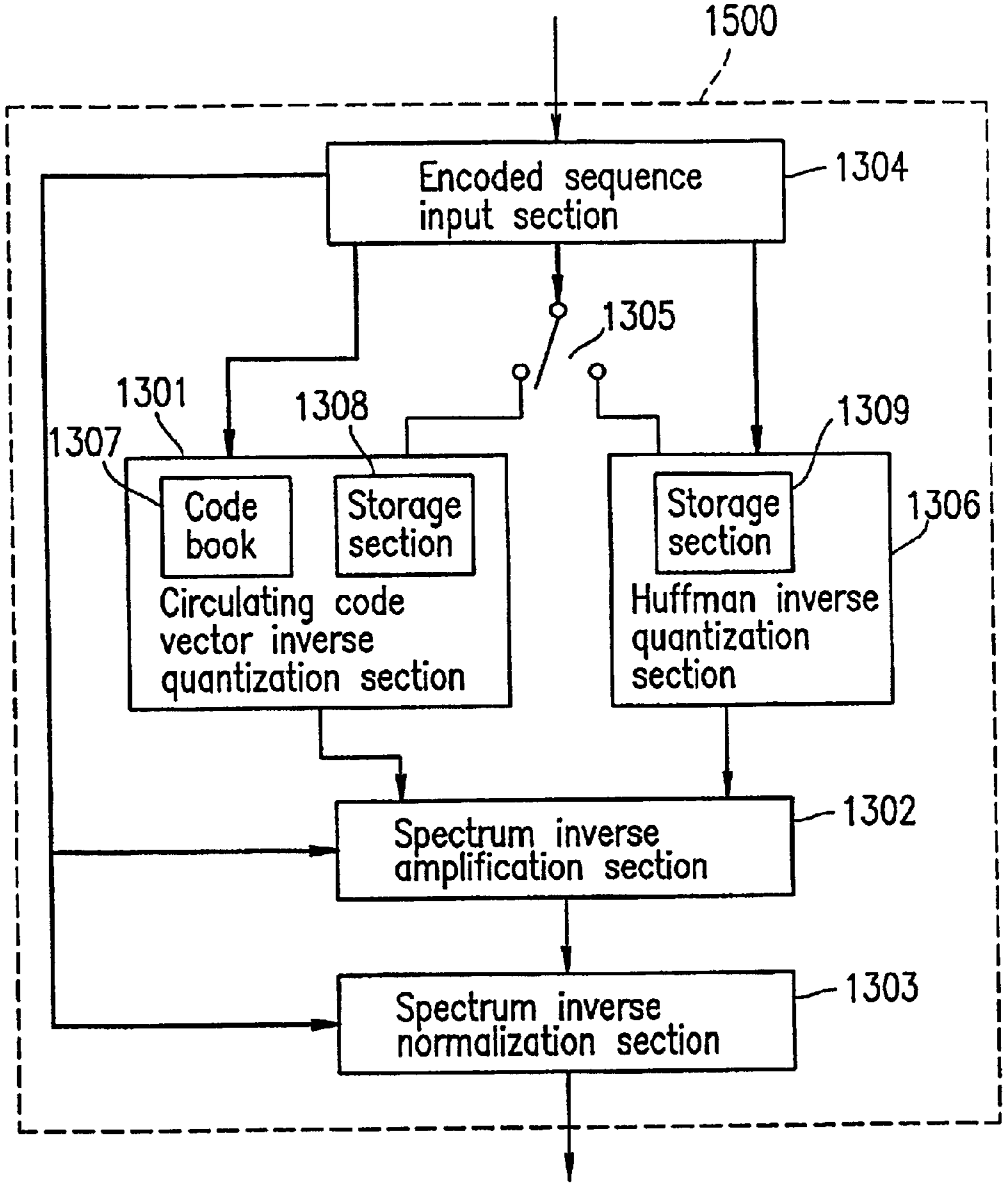
FIG. 15 is a diagram showing a configuration of a decoding apparatus according to Example 7 of the present invention.
Figure 16:
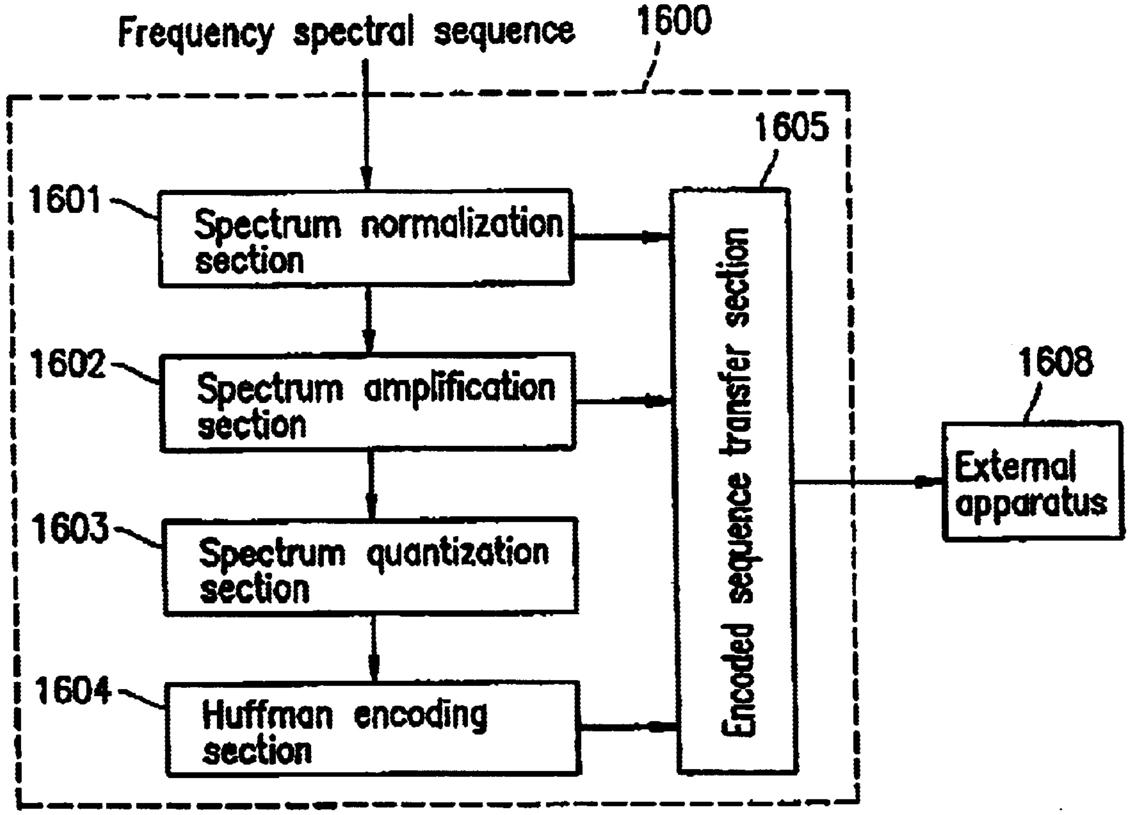
FIG. 16 CONVENTIONAL ART
FIG. 16 is a diagram showing a configuration of a conventional decoding apparatus.

Thereafter, a decoding apparatus according to Example 7 of the present invention will be described. FIG. 15 is a block diagram showing a configuration of a decoding apparatus 1500 of Example 7. The decoding apparatus 1500 receives an audio signal from an encoded sequence encoded by the encoding apparatus 900 of FIG. 9.

The decoding apparatus 1500 comprises a circulating code vector inverse quantization section 1301, a spectrum inverse amplification section 1302, a spectrum inverse normalization section 1303, an encoded sequence input section 1304, a decoding switching section 1305, and a Huffman inverse quantization section 1306. The circulating code vector inverse quantization section 1301 comprises a code book 1307 and a storage section 1308.

The circulating code vector inverse quantization section 1301, the spectrum inverse amplification section 1302, the spectrum inverse normalization section 1303, and the encoded sequence input section 1304 are the same as those of the decoding apparatus 1300 in FIG. 13, and descriptions thereof are thus omitted.

When receiving an encoded sequence, the encoded sequence input section 1304 extracts a Huffman code sequence, circulating position identification information, and an encoding format. Further, the encoded sequence input section 1304 extracts a correction gain and a scale factor. The encoded sequence input section 1304 outputs information about an encoding format to the decoding switching section 1305. The decoding switching section 1305 switches, based on the encoding format, between the circulating code vector inverse quantization section 1301 and the Huffman inverse quantization section 1306. The circulating position identification information is output to the circulating code vector inverse quantization section 1301, while the Huffman code sequence is output to the Huffman inverse quantization section 1306.

The Huffman inverse quantization section 1306 has a storage section 1309 for storing a Huffman code book. When the decoding switching section 1305 selects the Huffman inverse quantization section 1306, and outputs the Huffman code sequence, the Huffman inverse quantization section 1306 starts decoding. When the Huffman inverse quantization section 1306 receives the name of the Huffman code book and the Huffman code sequence, the Huffman inverse quantization section 1306 reads out an index value corresponding to the Huffman code sequence, and recovers a quantized spectral sequence. In this case, lossless decoding can be achieved.

The decoding switching section 1305 selects the circulating code vector inverse quantization section 1301 and outputs position circulation identification information, the same decoding as described in Example 6 is performed to recover a quantized spectral sequence.

A quantized spectral sequence generated by the Huffman inverse quantization section 1306 or the circulating code vector inverse quantization section 1301 is converted to frequency spectral data as described in Example 6.

Thereafter, the frequency-to-time conversion section (not shown) converts the above-described frequency spectral data to data on a time domain, i.e., PCM data. Further, the PCM data is subjected to D/A conversion to generate an analog audio signal.

Although in the above description the circulating code vector inverse quantization section 1301 generates a quantized spectral sequence only from circulating position identification information, the present invention is not limited to this. As described in Example 6, the circulating code vector inverse quantization section 1301 may generate a circulant quantized spectral sequence (i.e., a quantized spectral sequence) indicated by a spectral sequence code based on the spectral sequence code containing reference spectral sequence identification information and phase identification information in addition to circulating position identification information.

The encoding apparatus according to the present invention outputs a spectral sequence code containing circulating position identification information indicating how much a reference spectral sequence is circulated to obtain a circulant quantized spectral sequence which is most similar to a quantized spectral sequence. Therefore, the amount of information in encoding is reduced, thereby making it possible to obtain a higher level of sound quality.

Such an encoding apparatus requires a small calculation amount and a small capacity of storage section compared to conventional encoding methods. As a result, an encoding sequence can be efficiently generated at a small bit rate.

The decoding apparatus of the present invention has a reference spectral sequence, and generates a quantized spectral sequence based on a reference spectral sequence, and circulating position identification information indicating how much the reference spectral sequence is circulated to obtain a quantized spectral sequence. Therefore, the amount of information to be received by the decoding apparatus can be reduced and a higher level of sound quality can be efficiently obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An encoding apparatus, comprising:

a quantized spectral sequence generation section for generating a quantized spectral sequence by quantizing an audio signal with a predetermined quantization precision; and a circulating code vector quantization section for outputting a spectral sequence code containing circulating position identification information indicating how much a reference spectral sequence is circulated to obtain a circulant quantized spectral sequence which is most similar to the quantized spectral sequence.

2. An encoding apparatus according to claim 1, further comprising:

a Huffman encoding section for outputting a Huffman code sequence obtained by converting the quantized spectral sequence; and a encoding switching section for receiving the quantized spectral sequence and switching the output of the quantized spectral sequence between the circulating code vector quantization section and the Huffman encoding section under a predetermined condition.

3. An encoding apparatus according to claim 2, wherein:

the quantized spectral sequence generation section generates the quantized spectral sequence based on a frequency spectral sequence, wherein the frequency spectral sequence is spectral data for one frequency band out of a plurality of frequency bands obtained by dividing the audio signal; and the predetermined condition is dependent on a frequency band of the plurality of frequency bands of an audio signal, from which the frequency spectral sequence is derived.

4. An encoding apparatus according to claim 3, wherein when an assigned amount of information for the frequency band of the frequency spectral sequence is large, the encoding switching section outputs the quantized spectral sequence to the Huffman encoding section.

5. An encoding apparatus according to claim 3, wherein when an assigned amount of information for the frequency band of the frequency spectral sequence is small, the encoding switching section outputs the quantized spectral sequence to the circulating code vector quantization section.

6. An encoding apparatus according to claim 1, wherein the circulating code vector quantization section includes a code book having a first set of a plurality of circulant quantized spectral sequences obtained by circulating the reference spectral sequence.

7. An encoding apparatus according to claim 6, wherein out of the first set of a plurality of circulant quantized spectral sequences, the circulating code vector quantization section determines a circulant quantized spectral sequence having a largest inner product with the quantized spectral sequence as a circulant quantized spectral sequence most similar to the quantized spectral sequence.

8. An encoding apparatus according to claim 6, wherein out of the first set of a plurality of circulant quantized spectral sequences, the circulating code vector quantization section determines a circulant quantized spectral sequence having a largest modified inner product with the quantized spectral sequence as a circulant quantized spectral sequence most similar to the quantized spectral sequence.

9. An encoding apparatus according to claim 6, wherein the first set of a plurality of circulant quantized spectral sequences are represented by $$P_0=(c_0, c_1, c_2, \ldots, c_{n-1}, c_n)$$

$$P_1=(c_n, c_0, c_1, \ldots, c_{n-2}, c_{n-1})$$

$$P_2=(c_{n-1}, c_n, c_0, \ldots, c_{n-3}, c_{n-2})$$

$$\ldots$$

$$P_n=(c_1, c_2, c_3, \ldots, c_n, c_0)$$

where the reference spectral sequence is $P_0$, elements contained in each of the first set of a plurality of circulant quantized spectral sequences are $c_0, c_1, c_2, \ldots, c_{n-1}, c_n$, and the number of elements of each of the first set of a plurality of circulant quantized spectral sequences is n+1.

10. An encoding apparatus according to claim 9, wherein some of the elements, $c_0, c_1, c_2, \ldots, c_{n-1}, c_n$, contained in each of the first set of a plurality of circulant quantized spectral sequences are zero.

11. An encoding apparatus according to claim 9, wherein some of the elements, $c_0, c_1, c_2, \ldots, c_{n-1}, c_n$, contained in each of the first set of a plurality of circulant quantized spectral sequences are zero at predetermined intervals.

12. An encoding apparatus according to claim 6, wherein the code book further contains a second set of a plurality of circulant quantized spectral sequences, wherein each element of the second set of a plurality of circulant quantized spectral sequences has the same absolute value and the opposite sign with respect to a corresponding element of the first set of a plurality of circulant quantized spectral sequences.

13. An encoding apparatus according to claim 6, wherein the first set of a plurality of circulant quantized spectral sequences include circulant quantized spectral sequences obtained by circulating a plurality of reference spectral sequences having the same number of elements as that of the quantized spectral sequence.

14. A decoding apparatus, comprising:

a circulating code vector inverse quantization section having a reference spectral sequence for generating a quantized spectral sequence based on the reference spectral sequence and an input spectral sequence code;

a spectral inverse amplification section for receiving the quantized spectral sequence and subjecting the quantized spectral sequence to inverse amplification using a correction gain to generate an amplified spectral sequence; and a spectral inverse normalization section for receiving the amplified spectral sequence and converting the amplified spectral sequence, using a scale factor, to a frequency spectral sequence, wherein the spectral sequence code contains circulating position identification information indicating how much the reference spectral sequence is circulated to obtain the quantized spectral sequence.

15. A decoding apparatus according to claim 14, further comprising:

a Huffman inverse quantization section for receiving a Huffman code sequence and converting the Huffman code sequence to the quantized spectral sequence; and a decoding switching section for switching the output of the quantized spectral sequence between the circulating code vector inverse quantization section and the Huffman inverse quantization section under a predetermined condition, wherein the encoded sequence includes the Huffman code sequence.

* * * * *